US008991760B2

(12) United States Patent
Amante et al.

(10) Patent No.: US 8,991,760 B2
(45) Date of Patent: Mar. 31, 2015

(54) MOBILE ENERGY ATTENUATING SEAT AND SAFETY HARNESS FOR AIRCRAFT (75) Inventors: William A. Amante, Grapevine, TX (US); Darrell W. Wilkerson, Irving, TX (US); Jerry A. Pongratz, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 322 days.

(21) Appl. No.: 13/509,514

(22) PCT Filed: Nov. 10, 2010

(86) PCT No.: PCT/US2010/056216
§ 371 (c)(1),
(2), (4) Date: May 11, 2012

(87) PCT Pub. No.: WO2011/060061
PCT Pub. Date: May 19, 2011

(65) Prior Publication Data
US 2012/0223551 A1 Sep. 6, 2012

Related U.S. Application Data (60) Provisional application No. 61/260,062, filed on Nov. 11, 2009.

(51) Int. Cl.
*B64D 25/02* (2006.01)
*B64D 11/06* (2006.01)
(Continued)

(52) U.S. Cl.
CPC ............... *B64D 11/06* (2013.01); *B64D 25/04* (2013.01); *B64D 25/06* (2013.01); *B64D 2011/0627* (2013.01); *B64D 2011/0668* (2013.01)
USPC .................... 244/122 R; 244/118.6; 297/464; 297/470

(58) Field of Classification Search
CPC ............... B64D 11/20; B64D 11/0696; B64D 2011/0616; B64D 2011/0627; B64D 2011/0668; B64D 25/06; B60R 22/26; B60R 22/28; B60R 22/1952; B60R 2022/288; B60R 21/207
USPC ........ 244/118.5, 118.6, 122 R; 297/464, 468, 297/470, 471, 474
See application file for complete search history.

(56) References Cited

U.S. PATENT DOCUMENTS 2,829,702 A * 4/1958 Keating ..................... 297/183.9
3,314,720 A * 4/1967 Millington et al. ........ 297/216.1
(Continued)

FOREIGN PATENT DOCUMENTS

CN 1312189 A 9/2001
DE 10008258 A1 9/2001
(Continued)

OTHER PUBLICATIONS

Extended European Search Report in related European patent application No. 10830650, 7 pages, mailed Jul. 26, 2013.
(Continued)

*Primary Examiner* — Benjamin P Lee
(74) *Attorney, Agent, or Firm* — James E. Walton (57) ABSTRACT An energy attenuating seat system for an aircraft includes energy attenuating features and is also configured to provide mobility for the occupant. The system is configured to suspend the operator, or gunner, with a support from the roof of the aircraft. The system includes an armored seat or body harness for the occupant. The system provides energy attenuation in multiple directions. The system also optionally includes a floor tether in order to control the movements of the occupant. The system may also include an impact detection system to selectively change the tension of the support and/or floor harness. The system may also include one or more airbags either within in the fuselage of the aircraft, or included in the seat system in order to provide energy attenuation.

14 Claims, 7 Drawing Sheets

(51) Int. Cl.
    *B64D 25/04*      (2006.01)
    *B64D 25/06*      (2006.01)

(56)            References Cited

U.S. PATENT DOCUMENTS

| | | | |
|---|---|---|---|
| 3,868,143 | A | 2/1975 | Reilly |
| 4,474,347 | A | 10/1984 | Hazelsky |
| 4,563,023 | A * | 1/1986 | Clarkson ................ 280/748 |
| 5,415,431 | A * | 5/1995 | Omura ................... 280/805 |
| 6,299,102 | B2 * | 10/2001 | Happ .................. 244/122 AG |
| 7,275,710 | B2 * | 10/2007 | VanDruff et al. ........... 244/1 R |
| 7,293,818 | B2 * | 11/2007 | Kumpf et al. ............. 296/68.1 |
| 7,452,002 | B2 * | 11/2008 | Baumbach et al. ........ 280/743.2 |
| 7,513,558 | B2 * | 4/2009 | Hansen .................. 296/68.1 |
| 7,758,095 | B2 * | 7/2010 | Elhanany ................. 296/63 |
| 7,815,255 | B1 * | 10/2010 | Kiel et al. ............... 297/216.1 |
| 8,011,730 | B2 * | 9/2011 | Greenwood ............. 297/344.18 |
| 8,091,944 | B2 * | 1/2012 | Elhanany ................. 296/63 |
| 8,182,044 | B2 * | 5/2012 | Mullen .................. 297/471 |
| 8,240,767 | B2 * | 8/2012 | Greenwood ............. 297/344.18 |
| 8,317,262 | B2 * | 11/2012 | Schroth et al. ........... 297/216.1 |
| 8,414,026 | B1 * | 4/2013 | Lou et al. ............... 280/804 |
| 2004/0174063 | A1 | 9/2004 | Kocher |
| 2006/0011781 | A1 | 1/2006 | Knoll et al. |
| 2006/0186713 | A1 | 8/2006 | Breed |
| 2006/0284012 | A1 * | 12/2006 | VanDruff et al. ......... 244/118.5 |
| 2008/0015753 | A1 * | 1/2008 | Wereley et al. ............ 701/45 |
| 2008/0231068 | A1 * | 9/2008 | Elhanany ................. 296/63 |
| 2008/0246317 | A1 | 10/2008 | Hansen |
| 2009/0295208 | A1 * | 12/2009 | Elhanati et al. ............ 297/273 |
| 2010/0084907 | A1 * | 4/2010 | Greenwood et al. ......... 297/483 |
| 2010/0283298 | A1 * | 11/2010 | Hansen .................. 297/216.16 |
| 2013/0307313 | A1 * | 11/2013 | Greenwood et al. ......... 297/468 |
| 2014/0035338 | A1 * | 2/2014 | Greenwood et al. ...... 297/344.12 |

FOREIGN PATENT DOCUMENTS

| | | | | |
|---|---|---|---|---|
| DE | 102008005422 | B3 * | 10/2008 | ............... B60N 2/42 |
| EP | 1857147 | A1 | 11/2007 | |
| FR | 2389045 | A1 | 11/1978 | |
| WO | 2005223607 | A1 | 3/2005 | |

OTHER PUBLICATIONS

Canadian Office Action in related Canadian patent application No. 2,779,676, 2 pages, mailed Nov. 22, 2013.

International Search Report and the Written Opinion of the International Searching Authority mailed by ISA/USA, U.S. Patent and Trademark Office on Jan. 25, 2011 for International Patent Application No. PCT/US10/56216, 12 pages.

International Preliminary Report on Patentability mailed by ISA/USA, U.S. Patent and Trademark Office on Jan. 25, 2011 for International Patent Application No. PCT/US10/56216, 8 pages.

Office Action dated May 19, 2014 from counterpart EP App. No. 10830650.7.

Office Action dated Jul. 28, 2014 from counterpart CN App. No. 201080050515.2.

* cited by examiner

MOBILE ENERGY ATTENUATING SEAT AND SAFETY HARNESS FOR AIRCRAFT

TECHNICAL FIELD

The present application relates to aircraft seats and harnesses.

DESCRIPTION OF THE PRIOR ART

A military helicopter sometimes has a manually operated machine gun which operated by a "gunner." One common configuration is for the gunner to sit on a gunner's seat which is either fixed or rotatable. One shortcoming of this design is that the gunner is limited in his mobility by the geometric movements of the gunner's seat. Another shortcoming with the gunner's seat is that the gunner's seat is conventionally mounted to the floor of the cabin and only provides energy attenuation at very high g-forces and in primarily a vertical direction. As such, if the helicopter was to crash or have a hard landing while moving in a forward direction, while losing altitude, the gunner's seat would not be configured to attenuate the energy in the forward direction upon impact.

Helicopters typically employ the use of fixed structural seats for passengers. As mentioned herein regarding the gunner's seat, passenger seats typically lack energy attenuation capabilities in multiple directions. Further, fixed passenger seats typically add a significant amount of weight and cost to the helicopter. Additionally, converting the helicopter from a passenger configuration into a cargo configuration requires a significant amount of time to remove the structural passenger seats.

Hence, there is a need for a seating system in a helicopter which provides mobility for a gunner, or any other crew member whose duties require mobility. There is also a need for a passenger seating system which is lightweight and easily removable. There is also a need for seating system which provides energy attenuation in multiple directions, at low level g-forces, and as well as high level g-forces.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
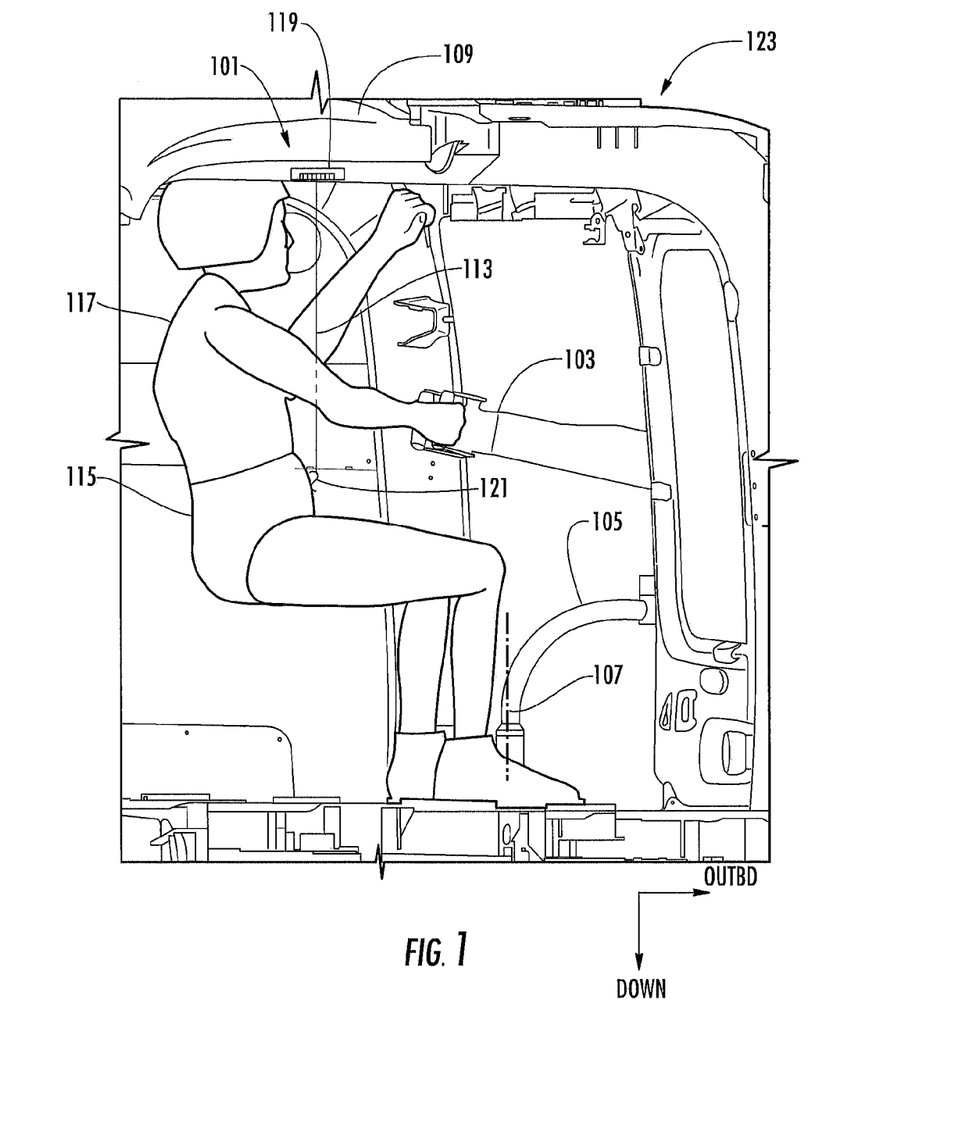
FIG. 1 is a front view of a system according the preferred embodiment according to the present application.

Referring to FIG. 1, mobile energy attenuating seat and safety harness system 101 is shown in an aircraft 123. In the preferred embodiment, aircraft 123 is a helicopter, but aircraft 123 may also be other types of aircraft, such as a tiltrotor, a tiltwing, or an airplane, to name a few. System 101 includes a support 113 that is preferably attached to a roof mount 119. Support 113 is configured to bear the weight, in tension, of a gunner 117. System further includes a seat 115 which is configured to provide ergonomic support of gunner 117. Seat 115 has a clip 121 configured for attachment to support 113.

In FIG. 1, gunner 117 is represented in position for operation of a machine gun 103. Gun 103 is mounted to a rotatable pintle mount 105, the pintle mount 105 being rotatable about axis of rotation 107. Gun 103 is also able to pivot in a direction that allows gunner 117 to change the firing elevation of gun 103. In order to operate gun 103 so as to have the ability to aim and fire at a full range of targets, gunner 117 needs to have sufficient mobility within aircraft 123. It should be appreciated that gunner 117 may also be an operator of a piece of equipment other than a gun 103. For example, gunner 117 may be a rescue worker operating a hoist in order to rescue a victim. The hoist is similar to gun 103 in that they both require an operator that has sufficient mobility to operate the equipment safely and effectively.

Support 113 is connected between gunner 117 and a roof 109 of aircraft 123, via a roof mount 119. Roof mount 119 may be of a variety of configurations depending upon the application. For example, roof mount 119 may simply be a hook type attachment means. Roof mount 119 may also be a flush mounted reel that can raise or lower gunner 117 by winding or unwinding support 113. It should be appreciated that roof mount 119 is configured to have structural integrity to support the weight of gunner 117 in worst case g-loading scenarios, such as a crash loading situation. Roof mount 119 may also be installed in a rail system which allows roof mount 119 to selectively travel in desired directions along a surface of roof 109. As discussed further herein, roof mount 119 may also incorporate energy attenuating devices such as vibration eliminators, shock absorbers, elastomeric members, and springs, to name a few.

Support 113 is preferably a non-rigid rope or cord having a selected material so as to provide energy attenuation effects. For example, in a simplistic configuration, the selected material of support 113 may be nylon fabric or rope. The inherent elastic material properties of the nylon fabric or rope are used to attenuate energy in order to lessen forces experienced by gunner 117 through the dynamic operation of aircraft 123. Support 113 may also be a shock absorber type configuration, as discussed further herein. Support 113 may also be a cable having substantially non-elastic properties wherein an energy attenuating device is connected between the roof mount 119 and the support 113. In another configuration, the energy attenuating device may be incorporated into the roof mount 119. An example of such a configuration would be the use of an inertia reel in the roof mount 119. In such an embodiment, the inertia reel provides resistance in either a linear or non-linear fashion by allowing the support 113 to unwind in a desired manner so as to attenuate energy that the gunner 117 might otherwise experience.

Still referring to FIG. 1, seat 115 is represented in an armored bucket seat configuration wherein seat 115 is fabricated with either a rigid or flexible armored material. A Kevlar™ material is one example of a material that may be used to fabricate seat 115 in the armored bucket seat configuration. It should also be appreciated that seat 115 may be of a wide variety of configurations, for example, seat 115 may encompass chest and back sections, in addition to a midsection of gunner 117. Seat 115 may also have multiple clips 121 in order to attach multiple tethering cords. Seat 115 may also have a back support so that gunner 117 may lean backward. Seat 115 may also be a full body harness having multiple straps and buckles so as to securely support gunner 117. Seat 115 may also have multiple supports 113 in order to suspend gunner 117 in a desired position.

Figure 2:
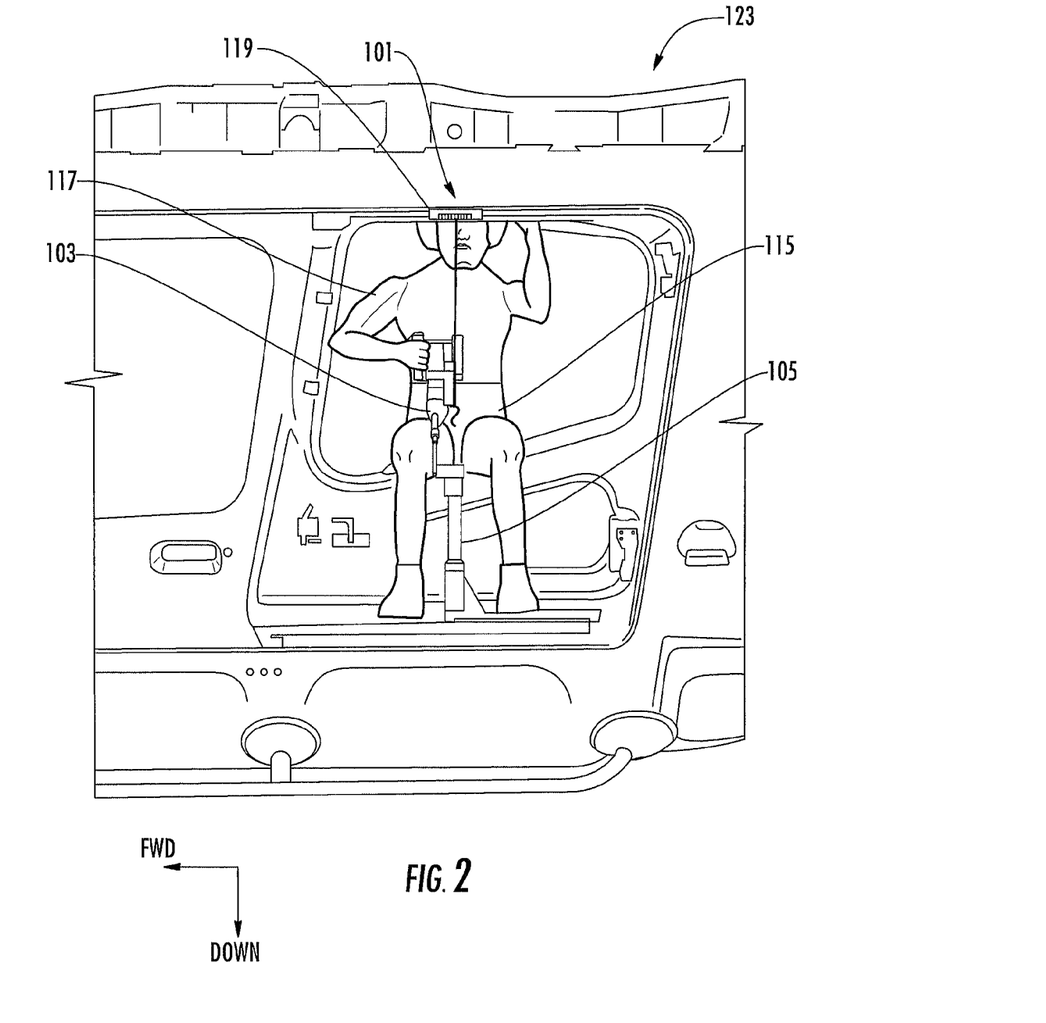
FIG. 2 is a side view of the system according to preferred embodiment shown in FIG. 1.

Referring now also to FIG. 2, system 101 is shown on aircraft 123 from a side view. Gunner 117 is shown being supported by system 101 while in position for operating gun 103. System 101 allows gunner 117 to move forward and aft by moving his legs and thus repositioning himself around gun 103.

Figure 3:
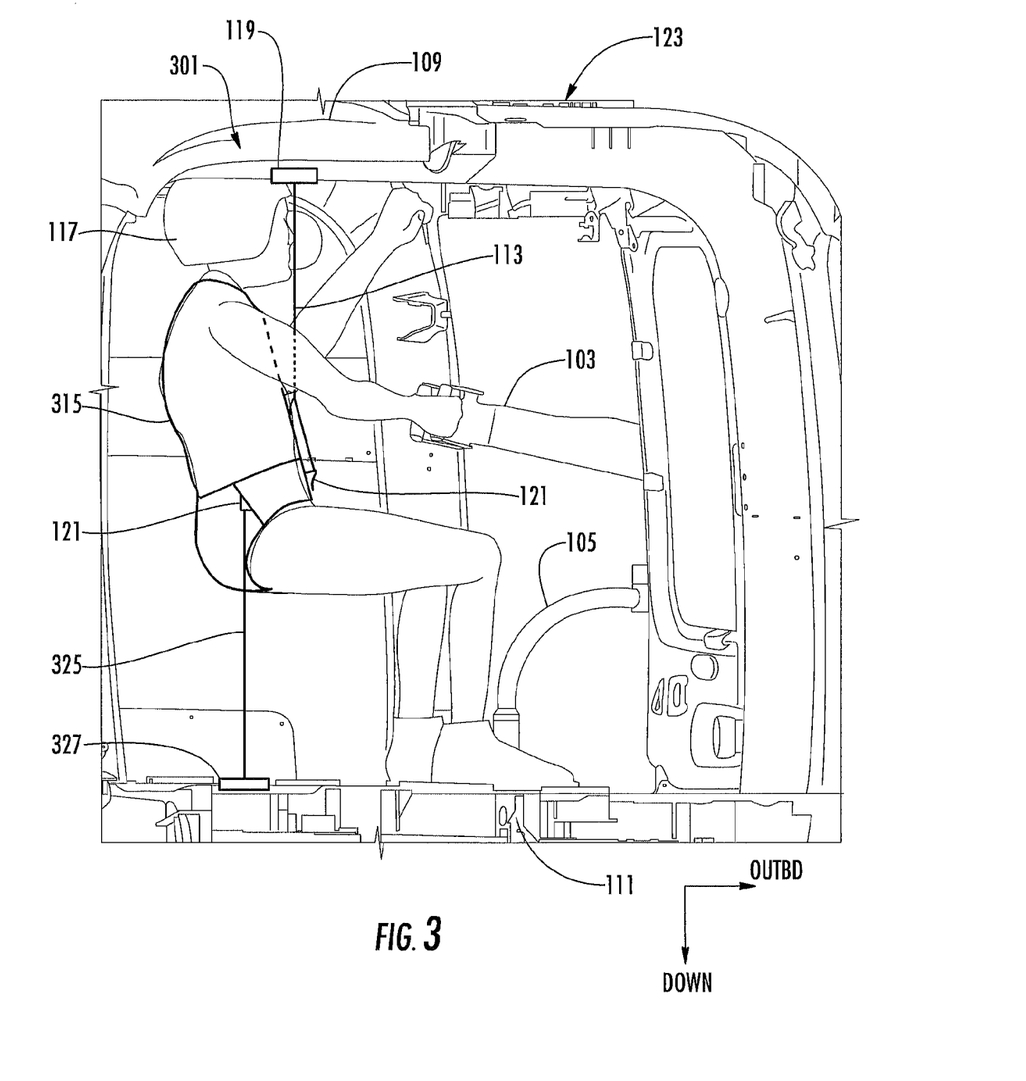
FIG. 3 is a front view of an alternative embodiment according to the present application.

Referring now also to FIG. 3, a system 301 is represented in an alternative embodiment of system 101. System 301 is illustrated in part to emphasize the possible variations of system 101. For example, seat 115 is represented as a full body harness 315. Full body harness 315 is configured to support gunner 117 around the gunner's midsection, shoulders, and upper legs. Full body harness 315 also has multiple clips 121 in order to provide multiple available points of attachment in order to optionally restrict movement of gunner 117. Roof mount 319 is configured as a flush mounted structure and configured to support gunner 117 in a variety of loading situations.

A floor tether 325 is shown as an additional restriction upon gunner 117. Floor tether 325 is configured to be attached to a floor mount 327 within a floor 111 so as to selectively restrict mobility of gunner 117. For example, when gunner 117 is operating gun 103 and needs full mobility, floor tether 325 may provide little or no tension. In such a configuration, floor mount 327 acts as a loose reel to easily allow to gunner 117 to pull additionally length of floor tether 325 out of floor mount 327. However, if gunner 117 is not operating gun 103, but simply functioning as a passenger, floor mount 327 may be configured such that tension upon floor tether 325 does not allow reel within floor mount 327 to release additional floor tether 325. As such, floor mount 327 may be selectively adjusted in order to allow or limit mobility of gunner 117 in various situations. It should be appreciated that multiple floor tethers 325 may be employed to attach full body harness 315 to multiple floor mounts 327.

Support 113 is shown in a configuration wherein support 113 is attached to clip 121 on the lower midsection of gunner 117 in addition to clip 121 on the chest area of gunner 117. By selective employing multiple attachments to harness 315, system 101 may be ergonomically tailored to support gunner 117.

Figure 4:
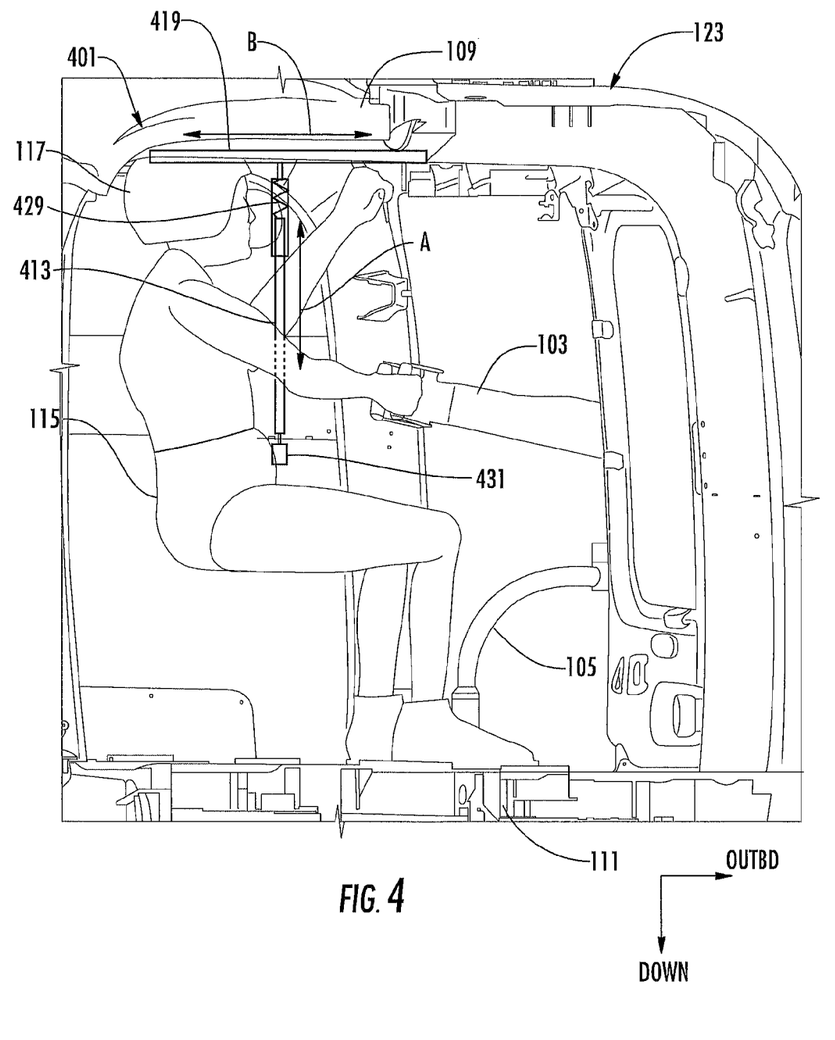
FIG. 4 is a front view of another alternative embodiment according to the present application.

Referring now also to FIG. 4, a system 401 is represented as an alternative embodiment of system 101. System 401 is illustrated in part to emphasize the possible variations of system 101. For example, support 113 is represented as a shock absorber 413. Shock absorber 413 is preferably constructed of primarily rigid components in addition to an internal energy attenuator. In the embodiment shown in FIG. 4, shock absorber is illustrated with a spring 429; however, other energy attenuation components, such as dampers, may be used. Shock absorber 413 is configured to compress and expand axially along a direction arrow A. A roof mount 419 is similar to roof mount 119, except that roof mount 419 provides movement along a roof surface in multiple directions; including in the direction represented by arrow B. Roof mount 419 preferably includes a spherical joint providing rotational freedom between shock absorber 413 and roof 109. A clip 431 is similar to clip 121, except that clip 431 preferably includes a quick release spherical ball configuration to provide additional freedom for rotation of shock absorber 413 in clip 431.

Figure 5:
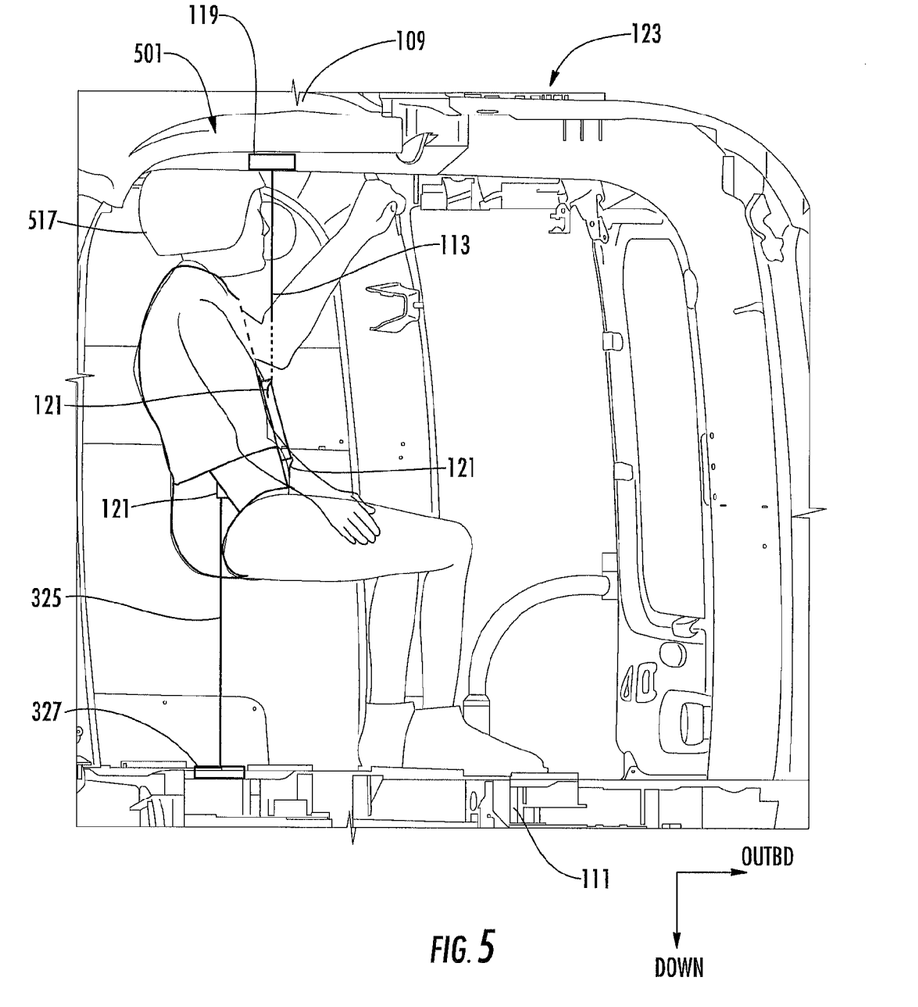
FIG. 5 is a front view of another alternative embodiment according to the present application.

Referring now also to FIG. 5, a system 501 is illustrated in part to emphasize the possible variations of system 101. System 501 includes a passenger 517 in lieu of gunner 117. Floor tether 325 is configured to be attached to a floor mount 327 so as to selectively restrict mobility of passenger 517. In such a configuration, passenger 517 is simply functioning as a passenger; as such, floor mount 327 may be selectively adjusted in order to allow or limit mobility of passenger 517. It should be appreciated that multiple floor tethers 325 may be employed to attach full body harness 315 to multiple floor mounts 327.

Figure 6A:
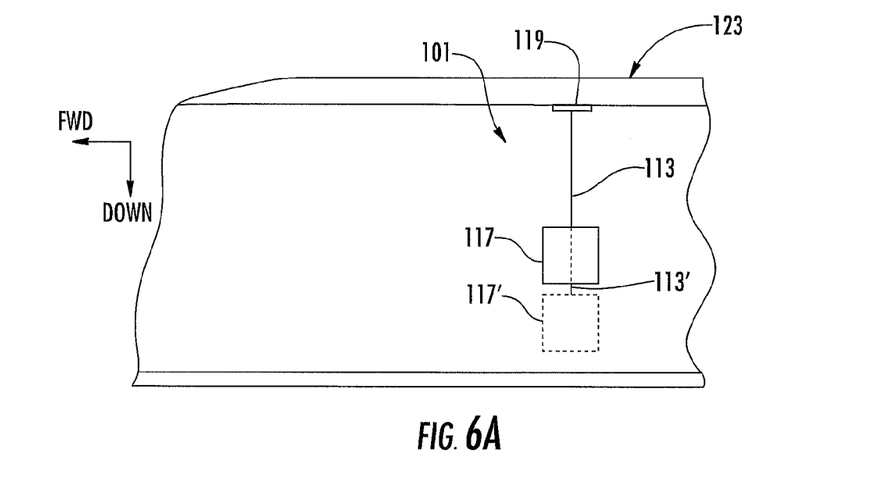
FIGS. 6A and 6B are schematic views of the preferred embodiment shown in FIG. 1.
Figure 6B:
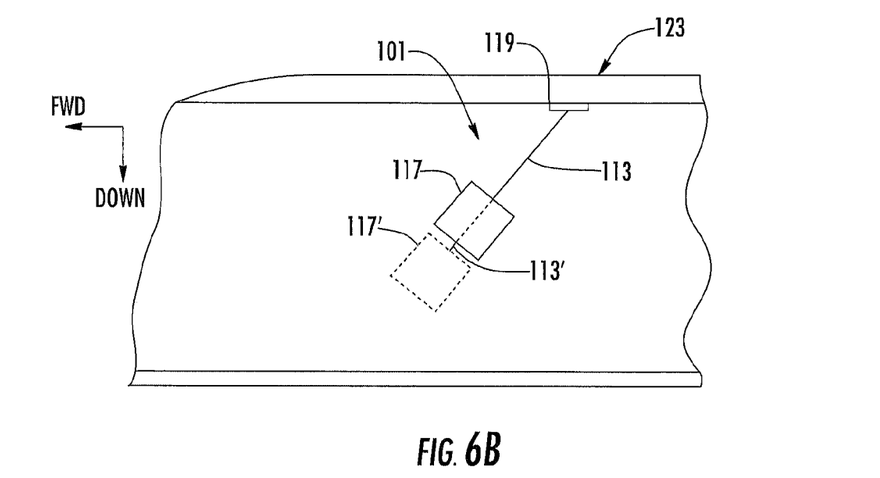

FIGS. 6A and 6B are schematic views meant to illustrate the energy attenuating features of system 101. Gunner 117 is represented as a mass connected to roof support 119 via support 113. If an impact of aircraft 123 with the ground produced a sudden deceleration involving primarily a vertical component, as shown in FIG. 6A, then system 101 acts to attenuate the energy through the stretching of support 113. As shown in FIG. 6A, support 113 stretches into 113' while gunner 117 moves into a new gunner position 117'. Because the deceleration is in primarily a vertical direction, support 113 also stretches in a primarily vertical direction.

FIG. 6B is similar to FIG. 6A, except that the sudden deceleration of aircraft 123 has a horizontal component in addition to a vertical component. As such, system 101 is configured to automatically attenuate energy in both vertical and horizontal directions. As shown in FIG. 6B, support 113 stretches into 113' while gunner 117 moves into a new gunner position 117'. It should be appreciated that FIGS. 6A and 6B are schematic in nature and meant to exemplify support 113 being configured to attenuate energy in various directions.

Figure 7:
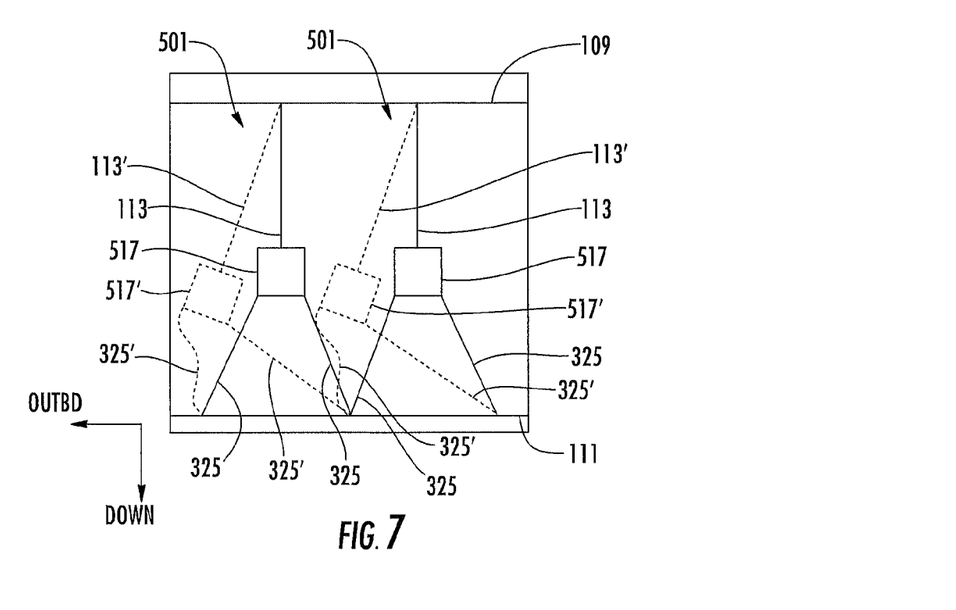
FIG. 7 is a schematic view of an alternative embodiment according to the present application.

FIG. 7 is a schematic view meant to illustrate energy attenuating features of multiple systems 501. Passengers 517 are represented as a masses connected to roof 109 via supports 113. Passengers 517 are also connected to floor 111. If an impact of aircraft 123 with the ground produces a sudden deceleration involving a vertical component and a lateral component, as shown in FIG. 7, then system 501 acts to attenuate the energy through the stretching of supports 113 and floor tethers 325. As shown in FIG. 7, each support 113 stretches into 113' while each passenger 517 moves into a passenger position 517'. Similarly, as each passenger 517 moves into passenger position 517', floor tethers 325 either become taught or become slack, depending on the location of each floor tether 325 in relation to the direction of energy attenuation. As shown in FIG. 7, floor tethers 325 may be selectively tailored to restrict movement of passengers 517 thereby preventing passengers 517 from colliding with fuselage structure while also providing additional energy attenuation. It should be appreciated that FIG. 7 is schematic in nature and meant to exemplify the optional use of floor tethers 325 in conjunction with support 113. It should also be appreciated that even though FIG. 7 illustrates system 501 with passengers 517, system 501 may be employed with gunners 117, or any combination of gunners 117 and passengers 517.

Figure 8A:
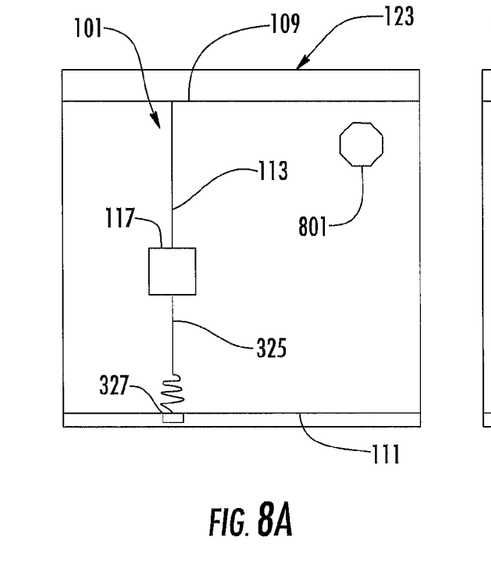
FIGS. 8A and 8B are schematic views of an alternative embodiment according to the present application.
Figure 8B:
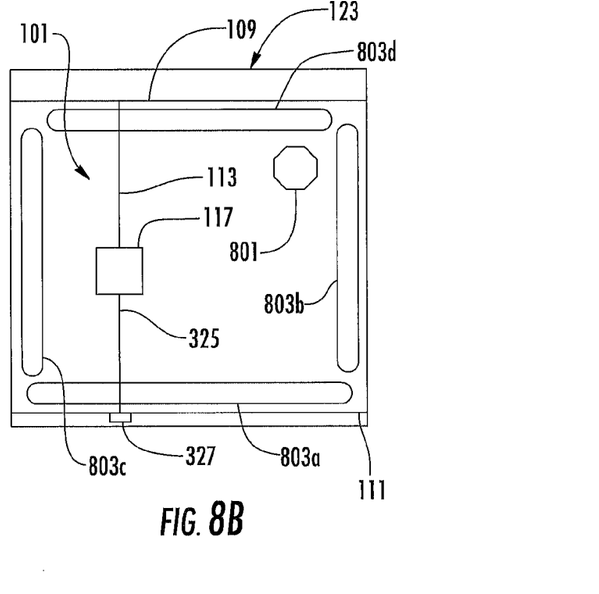

Referring now also to FIGS. 8A and 8B, system 101 is schematically represented with an impact detection system 801. Features of system 101 shown in FIGS. 8A and 8B include support 113 configured to elastically suspend gunner 117 from roof 109 of aircraft 123. Floor tether 325 is optionally attached to gunner 117. Floor tether 325 is configured so that the tension of floor tether 325 may be selectively adjusted by floor mount 327. In FIG. 8A, the tension of floor tether 325 is schematically represented as being loose enough to allow gunner 117 full freedom in order to operate a gun or other equipment. If aircraft 123 was in a situation where impact with the ground was determined to be likely, then impact detection system 801 would send a signal to floor mount 327 in order to selectively increase the tension of floor tether 325 to a level appropriate with the future impact predicted by impact detection system 801. It should also be appreciated that the adjustment features of adjustable floor mount 327 may also be incorporated into a roof support in order to selectively adjust the tension of support 113. Impact detection system 801 may also instigate other system changes within aircraft 327; for example, optional airbags 803a-803d within the fuselage may also be deployed to provide additional energy attenuation so as to increase the level of safety of gunner 117. One advantage of system 101 is that it allows relatively unobstructed area on fuselage floor 111 for an optional floor airbag 803a. Optional floor airbags 803a, side airbags 803b and 803c, and ceiling airbags 803d are configured to provide additional and redundant energy attenuating features.

In an alternative embodiment, one or more airbags 803a-803d may be incorporated into seat 115 (shown in FIG. 1) or full body harness 315 (shown in FIG. 3). In this embodiment, airbags are selectively integrated into seat 115 or harness 315 so as to provide energy attenuation in order to protect gunner 117 or passenger 517 from collisions with aircraft structure, aircraft occupants, cargo, or other objects. In this embodiment, airbags within seat 115 or harness 315 may be deployed by a variety of systems, including: impact detection system 801 in aircraft 123, or an accelerometer or other acceleration detection devices installed within seat 115, harness 315, or another part of systems 101, 301, 401, and 501.

The mobile energy attenuating seat and safety harness systems 101, 301, 401, and 501, according the present application, are configurable to provide energy attenuating and occupant support in a variety of situations. For example, each system may include an active system which measures vibrations, positions, and accelerations of aircraft 123 in order to actively change the elasticity and tension of at least one of support 113 and floor tether 325 in response to the measurements. The active system may also measure the force exerted upon support 113 and floor tether 325 to make tension and elasticity adjustments to at least one of the support 113 and floor tether 325. For example, if aircraft 123 performs a banking maneuver during flight, each support 113 and floor tether 325 may be selectively adjusted to approximately maintain the occupant in a desired position relevant to the position of aircraft 123, Each system may include a passive system which provides energy attenuation through a passive component, such as a vibration eliminator or vibration dampener, which produces a energy attenuating response between the occupant and the aircraft.

The mobile energy attenuating seat and safety harness system 101 is easily removable and/or stowable which greatly decreases the amount of time and work that is required to convert helicopter 123 into a cargo configuration. For example, if aircraft 123 were to employ system 101 in order to transport a gunner and passengers to a certain location, but then needed to transport cargo; system 101 is easily removable from the roof and floor. In contrast, prior art seats mounted to the floor require significantly more time to remove.

The system of the present application includes significant advantages, including: (1) being lightweight; (2) providing energy attenuation in multiple directions; (3) provides increased mobility for a gunner or other operator of equipment; and (4) allows for easy conversion from a passenger/gunner configuration to a cargo configuration.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An energy attenuating seat system for an aircraft, the system comprising:
   a seat configured for support of an occupant of the aircraft;
   a support coupled to the seat and to a roof of the aircraft, the support being configured to suspend a weight of the occupant in tension while also providing an energy attenuation;
   a floor tether coupled to the seat and to a floor mount of the aircraft, the floor mount attaches to the floor of the aircraft, the floor tether adapted to be retractable within the floor mount; and
   an active system which measures the dynamics of the aircraft and automatically changes an energy attenuating feature of the support in response to the aircraft dynamics measured by the active system;

wherein the floor mount adjusts the length of the floor tether to selectively vary the mobility of the occupant;

wherein the active control system actively changes the tension of the support in response to a change in the dynamics of the aircraft.

2. The seat system according to claim 1, wherein a position of the occupant is selectively changed through an adjustment of the floor tether and the support.

3. The seat system according to claim 1, wherein the tension of the floor tether and the support automatically changes according to an amount of load applied to each of the floor tether and the support.

4. The seat system according to claim 1, wherein the tension of the floor tether and the support are configured to be selectively changed.

5. The seat system according to claim 1, wherein the seat includes multiple attachment points for the attaching at least one of the support and the floor tether, each attachment point being configured to hold the occupant in a certain position.

6. The seat system according to claim 1, wherein the support and the floor tether can be selectively removed in order to convert the space to a cargo configuration.

7. The seat system according to claim 1, wherein the floor tether can be de-coupled from the floor of the aircraft in order to provide the occupant with mobility sufficient to perform a task.

8. The seat system according to claim 1, further comprising:
a second floor tether coupled to the floor and to the seat, the second floor tether configured to restrict the mobility of the occupant and provide additional energy attenuation.

9. The seat system according to claim 1, wherein the active system measures vibration experienced by the aircraft.

10. The seat system according to claim 1, wherein the active system measures the acceleration of the aircraft.

11. The seat system according to claim 1, wherein the active system measures the position of the aircraft.

12. The seat system according to claim 1, wherein the seat is a body harness.

13. The seat system according to claim 1, further comprising:
a seat position control system that is configured to selectively adjust the tension of the support and the floor tether to approximately maintain the occupant in a desired position relative to a position of the aircraft during flight.

14. The seat system according to claim 1, further comprising:
an airbag located between the seat and deployable from the floor, the airbag being deployable by a crash detection system, the airbag providing supplemental energy attenuation.

* * * * *